(12) United States Patent
Aljindan

(10) Patent No.: US 10,822,564 B2
(45) Date of Patent: Nov. 3, 2020

(54) PREVENTING HYDRATE FORMATION IN A FLOWLINE

(71) Applicant: Saudi Arabian Oil Company, Dhahran (SA)

(72) Inventor: Jana Mohammed Aljindan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/832,200

(22) Filed: Mar. 27, 2020

(65) Prior Publication Data

US 2020/0224111 A1    Jul. 16, 2020

Related U.S. Application Data

(62) Division of application No. 15/875,129, filed on Jan. 19, 2018.

(51) Int. Cl.
*C10L 3/10* (2006.01)
*E21B 43/24* (2006.01)
(Continued)

(52) U.S. Cl.
CPC .............. *C10L 3/107* (2013.01); *E21B 43/24* (2013.01); *E21B 47/103* (2020.05); *F16L 53/34* (2018.01); *F16L 53/38* (2018.01); *F17D 1/04* (2013.01); *C10L 2290/06* (2013.01)

(58) Field of Classification Search
CPC ........ F24H 9/2021; F24H 1/201; F24H 1/202; F24H 2240/00; F24H 2240/09;
(Continued)

(56) References Cited

U.S. PATENT DOCUMENTS

| 2,747,002 A | 5/1956 | Walker et al. |
| 3,364,337 A | 1/1968 | Kahn et al. |

(Continued)

FOREIGN PATENT DOCUMENTS

| WO | WO2009051495 | 4/2009 |
| WO | WO2012152986 | 11/2012 |
| WO | WO2017031563 | 8/2016 |

OTHER PUBLICATIONS

Lim, Chun Haur; Study on the Effect of Ultrasonic Wave Amplitude on Deemulsification of Crude Oil to enhance Production Process; Jan. 2016; Universiti Teknologi PETRONAS (Year: 2016).*

(Continued)

*Primary Examiner* — Serkan Akar
*Assistant Examiner* — Chris Q Liu
(74) *Attorney, Agent, or Firm* — Fish & Richardson P.C.

(57) ABSTRACT

A water content sensor is positioned within a flowline downstream of a well-choke. The water content sensor is configured to determine a water content percentage of a production fluid flowing through the flowline. A temperature sensor is positioned downstream of the well-choke. The temperature sensor is configured to determine a temperature of the production fluid flowing through the flowline. A heating jacket surroundings at least a portion of the flowline. The heating-jacket is configured to transfer heat into the flowline. A controller is configured to receive a signal from each of the water content sensor and the temperature sensor, and control the heating jacket in response to a signal from each of the water content sensor and the temperature sensor.

9 Claims, 2 Drawing Sheets

(51) Int. Cl.
*F16L 53/34* (2018.01)
*F17D 1/04* (2006.01)
*F16L 53/38* (2018.01)
*E21B 47/103* (2012.01)

(58) Field of Classification Search
CPC ... F24H 9/1818; F24H 9/2007; H05B 1/0202; H05B 1/0244; H05B 1/0269; H05B 1/0283; H05B 1/0297; H05B 2214/03; H05B 3/48; H05B 3/56; H05B 3/58; H05B 3/78; H05B 3/82
USPC ....... 219/482, 490, 496, 497, 214, 483, 484, 219/485, 486, 487, 488, 489, 491, 492, 219/493, 494, 495, 498, 499, 500, 501, 219/502, 503, 504, 506, 507, 508, 509; 392/301–306, 441, 463, 308, 442, 443, 392/444, 445, 447, 448, 449, 450, 451, 392/452, 453, 454, 455, 456, 457, 458, 392/459, 460, 461, 462, 464, 479, 480
See application file for complete search history.

(56) References Cited

U.S. PATENT DOCUMENTS

| | | |
|---|---|---|
| 3,398,262 A | 8/1968 | Kahn et al. |
| 3,423,570 A | 1/1969 | Trabilcy et al. |
| 3,519,023 A | 7/1970 | Burns et al. |
| 4,725,713 A | 2/1988 | Lehrke |
| 5,933,574 A | 8/1999 | Avansino et al. |
| 6,564,011 B1 | 5/2003 | Janoff et al. |
| 7,260,320 B2 | 8/2007 | Stanzel et al. |
| 8,061,308 B2 | 11/2011 | Phillips |
| 8,311,402 B2 | 11/2012 | Steinhauser et al. |
| 8,623,147 B2 | 1/2014 | Hoffman |
| 8,763,411 B2 | 7/2014 | Wray |
| 2003/0020499 A1 | 1/2003 | Bass |
| 2011/0008899 A1 | 1/2011 | Polemitis |
| 2012/0085544 A1 | 4/2012 | Shilling et al. |

OTHER PUBLICATIONS

"Electrically Trace Heated Pipe-in-Pipe," Engineering and Technologies, Technip, Jan. 2016, 6 pages.

Lim et al., "Study on the Effect of Ultrasonic Wave Amplitude on Deemulsification of Crude Oil to Enhance Production Process," Universiti Teknologi Petronas, Jan. 2016.

International Search Report and Written Opinion issued in International Application No. PCT/US2019/013981 dated Apr. 10, 2019, 15 pages.

GCC Examination Report in GCC Appln. No. GC 2019-36850, dated May 17, 2020, 4 pages.

* cited by examiner

PREVENTING HYDRATE FORMATION IN A FLOWLINE

CROSS-REFERENCE TO RELATED PATENT APPLICATIONS

This application is a divisional of and claims the benefit of priority to U.S. patent application Ser. No. 15/875,129, filed Jan. 19, 2018, the contents of which are incorporated by reference herein.

TECHNICAL FIELD

This disclosure relates to using heat jackets for preventing hydrate formation, for example, in flowlines through which fluids, for example, production fluids, flow.

BACKGROUND

Hydrates are solid crystalline compounds of snow-like appearance with densities less than that of ice. Natural gas hydrates are formed when natural gas components, for instance, methane, ethane, propane, isobutene, hydrogen sulfide, carbon dioxide, and nitrogen, occupy empty lattice positions in the water structure. In some instances, hydrate formation occurs at temperatures considerably higher than the freezing point of water. Gas hydrates constitute a solid solution, gas being the solute and water the solvent, where the two main constituents are not chemically bounded.

Hydrates form at specific temperature and pressure ranges that are dependent on the ratio of hydrocarbons to water and the type of hydrocarbons present. Flow assurance models are often run and analyzed to ensure that hydrate formation does not occur at a production facility.

SUMMARY

This disclosure describes technologies relating to preventing hydrate formation in a flowline.

An example implementation of the subject matter described within this disclosure is a system with the following features. A water content sensor is positioned within a flowline downstream of a well-choke. The water content sensor is configured to determine a water content percentage of a production fluid flowing through the flowline. A temperature sensor is positioned downstream of the well-choke. The temperature sensor is configured to determine a temperature of the production fluid flowing through the flowline. A heating-jacket surroundings at least a portion of the flowline. The heating-jacket is configured to transfer heat into the flowline. A controller is configured to receive a signal from each of the water content sensor and the temperature sensor, and control the heating jacket in response to a signal from each of the water content sensor and the temperature sensor.

Aspects of the example implementation, which can be combined with the example implementation alone or in combination, include the following. The heating jacket include electric heaters.

Aspects of the example implementation, which can be combined with the example implementation alone or in combination, include the following. The electric heaters include inductive heaters.

Aspects of the example implementation, which can be combined with the example implementation alone or in combination, include the following. The electric heaters include direct current heaters.

Aspects of the example implementation, which can be combined with the example implementation alone or in combination, include the following. The heating jacket is configured to deliver at least five megawatts of heating into the flowline.

Aspects of the example implementation, which can be combined with the example implementation alone or in combination, include the following. The heating jacket substantially covers at least one hundred feet of the flowline.

Aspects of the example implementation, which can be combined with the example implementation alone or in combination, include the following. The heating jacket comprises a multiple sub-heat jackets.

Aspects of the example implementation, which can be combined with the example implementation alone or in combination, include the following. The temperature sensor includes a distributed temperature sensor configured to determine a temperature profile along a length of the flowline.

Aspects of the example implementation, which can be combined with the example implementation alone or in combination, include the following. A pressure sensor is positioned within the flowline downstream of a well-choke. The pressure sensor is configured to detect a pressure within the flowline.

Aspects of the example implementation, which can be combined with the example implementation alone or in combination, include the following. The controller is configured to receive a signal from the pressure sensor. The controller is configured to control the heating jacket in response to the signal from the pressure signal.

Aspects of the example implementation, which can be combined with the example implementation alone or in combination, include the following. The controller is configured to determine a water content threshold of a production fluid flowing through the flowline in response to the signal received from the water content sensor. The controller is configured to determine that a flowline temperature downstream of the well-choke decreases to be less than a first specified temperature based on the signal received from the temperature sensor. The controller is configured to activate a heating jacket in response to determining that the flowline temperature is less than the first specified temperature.

Aspects of the example implementation, which can be combined with the example implementation alone or in combination, include the following. The controller is further configured to open a well-choke configured to throttle production of a well.

Aspects of the example implementation, which can be combined with the example implementation alone or in combination, include the following. The controller is further configured to determine that a flowline temperature downstream of the well-choke increases to be greater than a second specified temperature, that is equal to or greater than the first specified temperature, based on the signal received from the temperature sensor, and deactivate the heating jacket in response to determining that the flowline temperature is greater than the second specified temperature.

Aspects of the example implementation, which can be combined with the example implementation alone or in combination, include the following. The water content threshold is greater than five percent water content by weight.

An example implementation of the subject matter described within this disclosure is a method with the following features. A water content of a production fluid flowing through an open well-choke is determined to be greater than a specified percentage. A flowline temperature downstream of the well-choke is determined to decrease to be below a first specified temperature. A heating jacket is activated in response to determining that the flowline temperature is less than the first specified temperature. A flowline temperature downstream of the well-choke is determined to increase to be greater than a second specified temperature that is equal to or greater than the first specified temperature. The heating jacket is deactivated in response to determining that the flowline temperature is greater than the second specified temperature.

Aspects of the example method, which can be combined with the example method alone or in combination, include the following. A well-choke configured to throttle production of a well is opened.

Aspects of the example method, which can be combined with the example method alone or in combination, include the following. A pressure within the flowline is determined in response to a signal from a pressure sensor. A heating jacket is activated in response to the determined pressure.

Aspects of the example method, which can be combined with the example method alone or in combination, include the following. a pressure within the flowline is determined in response to a signal from a pressure sensor. A heating jacket is deactivated in response to the determined pressure.

Aspects of the example method, which can be combined with the example method alone or in combination, include the following. The specified percentage is five percent.

Aspects of the example method, which can be combined with the example method alone or in combination, include the following. Determining a temperature includes using a distributed temperature sensor.

Aspects of the example method, which can be combined with the example method alone or in combination, include the following. Activating the heating jacket includes directing an electrical current through heat elements within the heating jacket.

Aspects of the example method, which can be combined with the example method alone or in combination, include the following. The current is a direct current.

Aspects of the example method, which can be combined with the example method alone or in combination, include the following. The heating elements include inductive heating elements.

An example implementation of the subject matter described within this disclosure is a controller with one or more processors and a non-transitory computer-readable storage medium coupled to the one or more processors and storing programming instructions for execution by the one or more processors. The programming instructions instruct the one or more processors to open a well-choke configured to throttle production of a well. The programming instructions instruct the one or more processors to determine that a water content of a production fluid flowing through the open well-choke is greater than five percent in response to a signal received from a water content sensor. The programming instructions instruct the one or more processors to determine that a flowline temperature downstream of the well-choke decreases to be less than a first specified temperature in response to a signal received from a temperature sensor. The programming instructions instruct the one or more processors to activate a heating jacket in response to determining that the flowline temperature is less than the first specified temperature. The programming instructions instruct the one or more processors to determine that a flowline temperature downstream of the well-choke increases to be greater than a second specified temperature that is equal to or greater than the first specified temperature in response to a signal received from the temperature sensor. The programming instructions instruct the one or more processors to deactivate the heating jacket in response to determining that the flowline temperature is greater the second specified temperature.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Hydrate formation within a flowline can temporarily stop production through the flowline. In the context of this disclosure, the "flowline" is a piping section between a wellhead-choke and a production manifold. However, aspects of this disclosure are applicable to any pipe carrying fluid from one position to another. In general, this disclosure assumes a metallic flowline, but other flowline materials can be used without departing from the scope of this disclosure. Flow assurance models can be run to determine what well-flow scenarios can result in hydrate formation, but some flow scenarios may not be avoidable, particularly, if the scenario includes start-up or shut-down conditions. During start-up and shut-down operations, a wellhead choke creates a large pressure drop within the flowline. Such a pressure drop can result in Joule-Thomson effect cooling that can decrease the temperature of flowing well-flow into a hydrate forming range.

This disclosure relates to a system and method to prevent hydrate formation in the flowline by minimizing a temperature drop resulting from the Joule-Thomson effect across the pipeline. The system includes electric heating jackets installed around a flowline immediately downstream of the choke. The electric heating jackets are activated when there is a high probability of hydrate formation. The threshold for a "high probability" can be determined by the end user. For example, in some instances, a 10% chance ca be considered a high probability. In some instances, a 50% chance is considered a high probability. The probability of hydrate formation is determined based on the temperature, the water content, and the pressure of the gas going through the choke.

Figure 1:
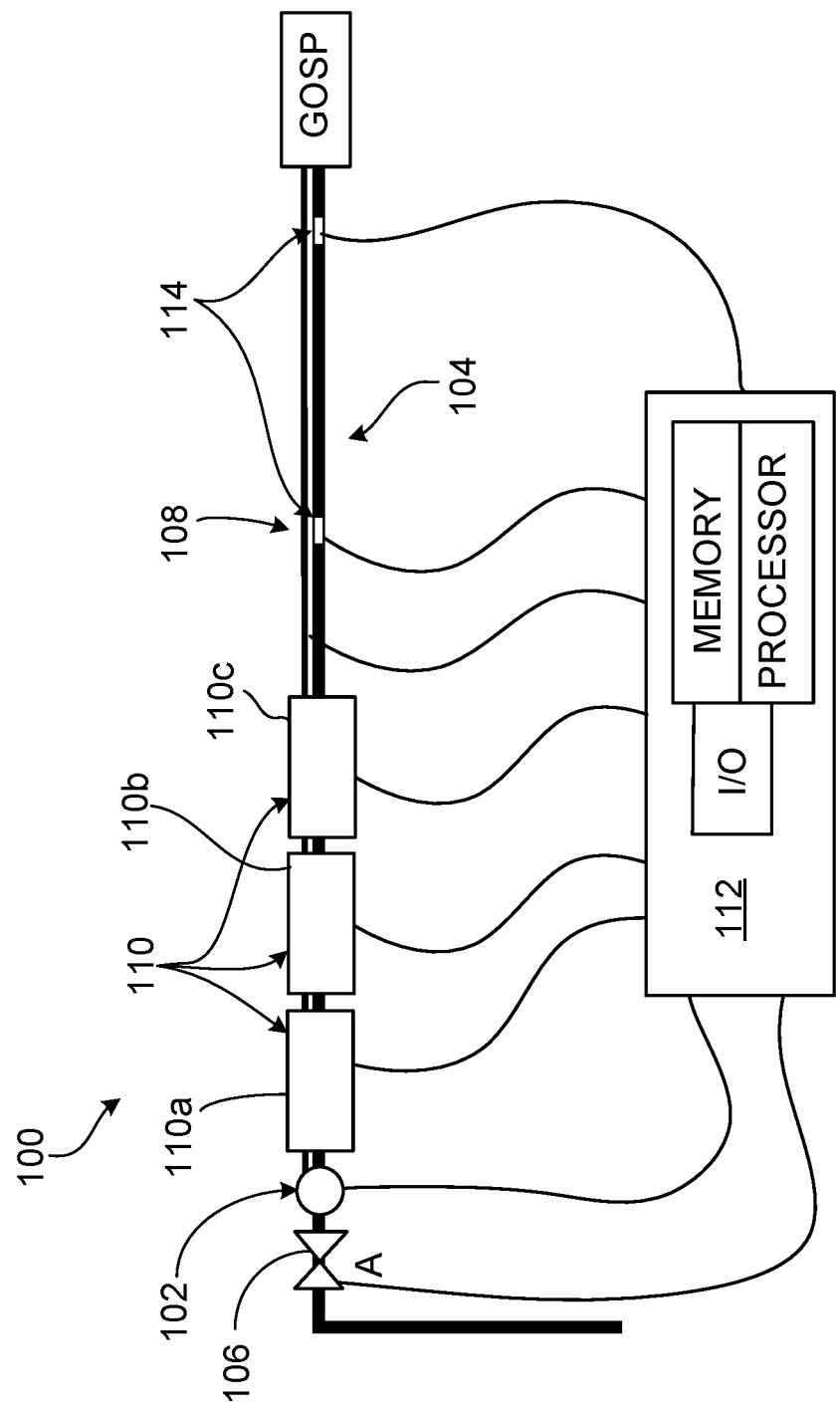
FIG. 1 is a schematic diagram of an example hydrate prevention system.

FIG. 1 shows an example hydrate prevention system 100. The hydrate prevention system 100 includes a water content sensor 102 positioned within a flowline 104 downstream of a well-choke 106.

The well-choke 106 is configured to throttle production of the well. The well-choke includes a specially designed valve and actuator. The valve is configured to allow a large pressure drop across the valve without "cutting" the valve, that is, the valve will resist deterioration due to cavitation or erosion. In some instances, the large pressure drop can range from substantially 100 pounds per square inch (PSI) to several thousand PSI. The actuator is configured to precisely control the position of the valve based on production demands, that is, the actuator controls how much the choke is opened and closed. A well-flow flow-rate is regulated based on the position of the valve and the resulting pressure drop across the valve due to the valve's position.

The water content sensor 102 is configured to determine a water content percentage of a production fluid flowing through the flowline 104. The water content sensor 102 is positioned within the flowline 104 and downstream of the well-choke 106.

A temperature sensor 108 is positioned within or along the flowline downstream of the well-choke. The temperature sensor 108 is configured to determine a temperature of the production fluid flowing through the flowline 104. In some implementations, the temperature sensor 108 includes a distributed temperature sensor configured to determine a temperature profile along a length of the flowline 104. In some implementations, the temperature sensor 108 can be positioned outside of the flowline 104. In some implementations, the temperature sensor 108 can be positioned within the flowline. The temperature sensor 108 can include a thermocouple, calibrated spring, fiber optic line, or any other temperature sensing device.

One or more pressure sensors 114 are positioned within the flowline 104 downstream of a well-choke 106. The one or more pressure sensors 114 are configured to detect a pressure within the flowline 104. In some implementations, a distributed pressure sensor can be used.

One or more heating jackets 110 surround at least a portion of the flowline 104. In some implementations, the heating jacket 110 can be a flexible blanket that can be wrapped around the flowline 104 and secured using wire-ties or other securing mechanisms. In some instances, the heating jacket 110 is rigid and is configured to be secured around a specific pipe size of the flowline 104. In such an implementation, the heating jacket 110 can be secured with a clamp, screw, or other fastener. The heating jacket 110 is configured to transfer heating into the flowline 104. In some implementations, the heating jacket 110 is positioned close to the well choke 106, for example, as close as possible with the present piping configuration. The heating jacket 110 can include electric heaters or tubing through which a heated fluid flows. In the instance of an electric heater being used, the electric heater can include a direct current heater, an alternating current heater, an inductive heater, a conductive heater, a radiant heater, any combination of them, or any other type of electric heater. In some implementations, a radiation heat jacket is used. Regardless of the type of heating mechanism used, the heating jackets 110 are configured to deliver a large amount of heat, for example, five megawatts to ten megawatts of heat, into the flowline. There are certain relationships that can dictate how much heat is required by the system. For example, a larger diameter flowline 104 may require more heat than a smaller diameter flowline. In some implementations, a flowline 104 that experiences a larger pressure drop will require more heat than a flowline 104 that experiences a smaller pressure drop. The pressure drop can be affected by the diameter and length of the flowline 104. The heating jackets 110 can substantially cover at least one hundred feet of the flowline 104 within plus or minus ten feet. In some instances, the heating jackets 110 can cover at least three hundred feet of the flowline 104. In some instances, the heating jacket 110 includes multiple, smaller sub-heat jackets that can be interconnected to a power supply in series or parallel. In the illustrated example, the one or more heating jackets 110 includes three sub-heat jackets 110a, 110b, and 110c. The sub-heat jackets can be wired together as a group to act as a single jacket. The gaps provided by the sub-heat jackets can create clearance for flanges or valves to protrude from the one or more heating jackets 110. While the illustrated implementation includes three sub-jackets, any number of sub jackets can be used. The heating jackets 110 can be permanent installations or temporary installations.

The system 100 also includes a controller 112 that is connected to the water content sensor 102, the one or more heating jackets 110, the temperature sensor 108, and one or more pressure sensors 114 that are configured to detect a pressure within the flowline 104. The controller 112 is configured to receive a signal from the water content sensor 102, a signal from the temperature sensor 108, and a signal from the pressure sensor 114. The controller 112 is also configured to control, that is, activate, deactivate, or both, the heating jacket 110 in response to a signal from the water content sensor 102, the temperature sensor 108, the pressure sensor 114, or any combination. In some instances, the controller 112 can activate, deactivate, or both, the heating jacket 110 in response to an operator input.

The controller 112 includes one or more processors and a non-transitory computer-readable storage medium coupled to the one or more processors. Additionally, the controller 112 includes an input/output (I/O) module configured to send and receive signals to and from the outside of the controller 112. For example, the I/O module can receive signals from sensors, such as the temperature sensor 108, the pressure sensor 114, or water content sensor 102. For Example, the I/O module can send a signal to activate the heating jackets 110. The non-transitory memory stores programming instructions for execution by the one or more processors. For example, the programming instructions can instruct the one or more processors to do the following tasks.

In some instances, the I/O module of the controller 112 can open the well-choke 106 by sending a signal to the actuator on the choke 106. The controller 112 can determine that the water content of a production fluid flowing through the open well-choke 106 is greater than a specified threshold, stored in the non-transitory memory, in response to a signal received from the water content sensor 102. In some instances, the specified threshold can be a water content percentage, such as five percent. The signal from the water content sensor 102 can include a current, voltage, or hydraulic pressure that is interpreted by the controller 112 to be indicative of a water content value. For example, the specified threshold can be greater than or equal to five percent by weight of water.

Figure 2:
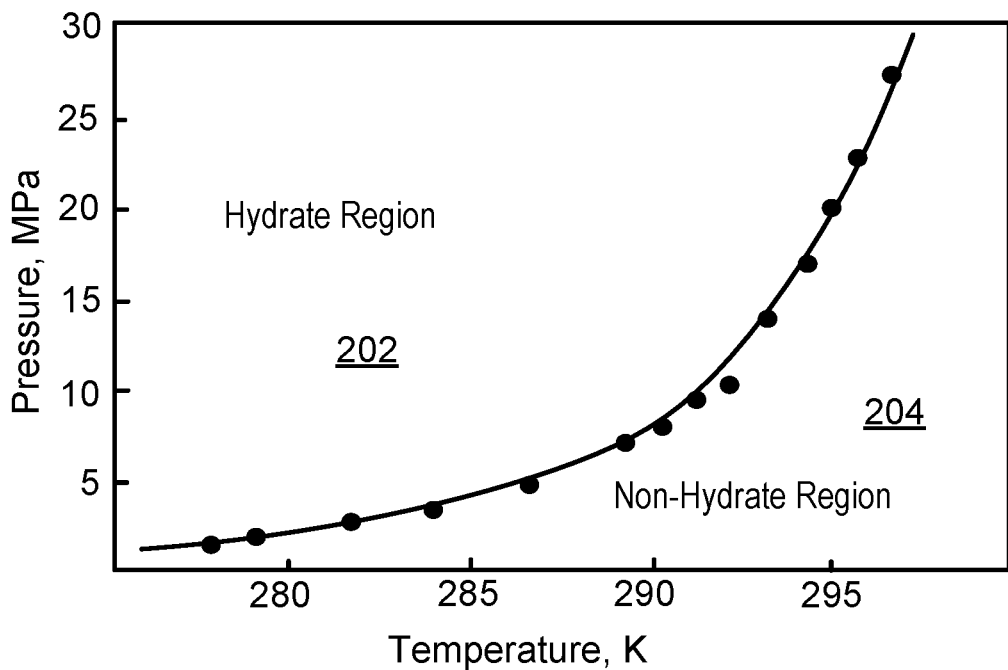
FIG. 2 is a chart of an example hydrate forming region and non-hydrate forming region.

The controller 112 can determine if a flowline pressure downstream of the well-choke 106 decreases to be less than a first specified pressure value, stored in the non-transitory memory, in response to a signal received from a pressure sensor 114. The specified pressure can be a pressure value below which hydrate formation is likely. The signal from the pressure sensor 114 can include a current, voltage, or hydraulic pressure that is interpreted by the controller 112 to be indicative of a pressure value. For example, a threshold pressure can be five Megapascals (Mpa) in some instances. The controller 112 can activate the heating jacket 110, that is, turn on the heating jacket, in response to determining that the flowline 104 pressure is less than the first specified temperature. While the system 100 is primarily described within this model as having a threshold-based control scheme, any control scheme based on any flow assurance model can be used. For example, as shown in FIG. 2, a function of pressures and temperatures can be used to plot a hydrate region 202 and a non-hydrate region 204. If the controller senses a pressure and temperature within the hydrate region 202, then the heating jacket 110 is activated. If the pressure and temperature are in the non-hydrate region 204, then the heating jacket 110 will be deactivated by the controller 112 ore remain inactive.

The controller 112 can determine if a flowline temperature downstream of the well-choke 106 decreases to be below a first specified temperature value, stored in the non-transitory memory, in response to a signal received from a temperature sensor 108. The signal from the temperature sensor 108 can include a current, voltage, or hydraulic pressure that is interpreted by the controller 112 to be indicative of a temperature value. For example, the threshold temperature can be 285 Kelvin (K) in some instances. The controller 112 can activate the heating jacket 110, that is, turn on the heating jacket, in response to determining that the flowline 104 temperature is less than the first specified temperature. While the system 100 is primarily described within this model as having a threshold-based control scheme, any control scheme based on any flow assurance model can be used. For example, as shown in FIG. 2, a function of pressures and temperatures can be used to plot a hydrate region 202 and a non-hydrate region 204. If the controller senses a pressure and temperature within the hydrate region 202, then the heating jacket 110 is activated. If the pressure and temperature are in the non-hydrate region 204, then the heating jacket 110 will be deactivated by the controller 112 or remain inactive. The controller 112 can determine that a flowline 104 temperature downstream of the well-choke 106 increases to be greater than a second specified temperature value, stored in the non-transitory memory, that is equal to or greater than the first specified temperature in response to a signal received from the temperature sensor 108. The signal from the temperature sensor 108 can include a current, voltage, or hydraulic pressure that is interpreted by the controller 112 to be indicative of a temperature value. For example, the second temperature can be greater than or equal to the first temperature in some instances. The controller 112 can deactivate the heating jacket 110 in response to determining that the flowline 104 temperature is greater than the second specified temperature.

Figure 3:
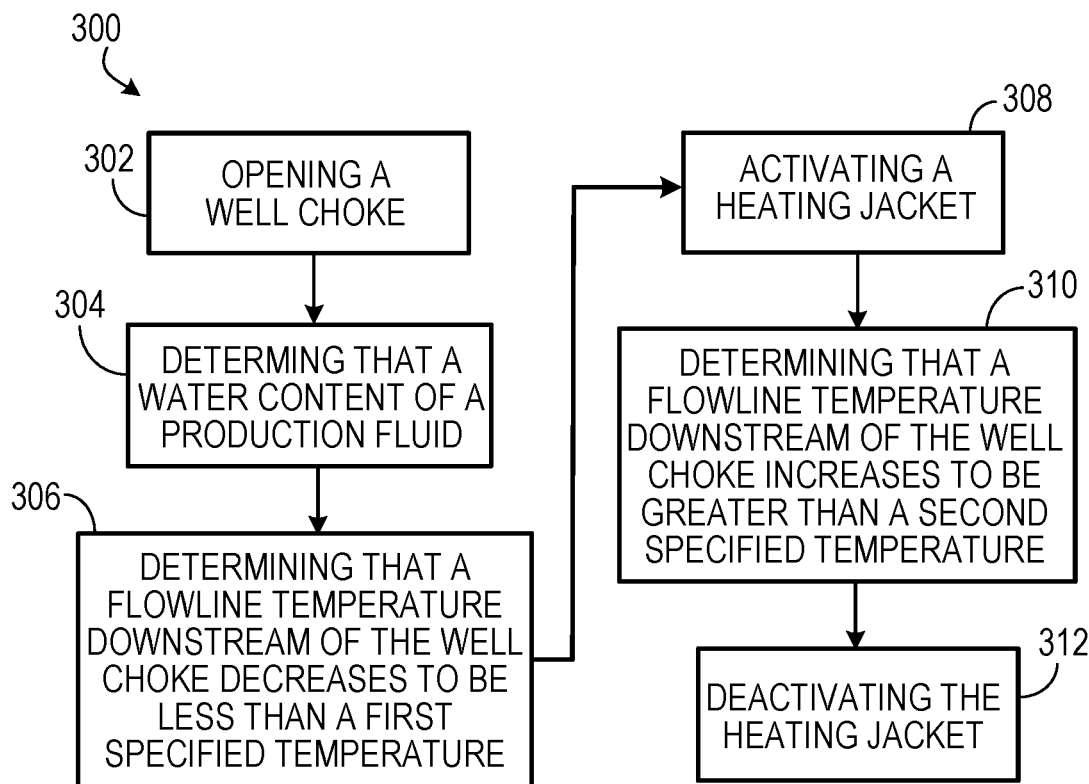
FIG. 3 is a flowchart of an example method that can be used with aspects of this disclosure.

FIG. 3 is a flowchart of an example method 300 that can be used with aspects of this disclosure. At 302, the well-choke 106 configured to throttle production of a well is opened. At 304, a water content of a production fluid flowing through the open well-choke 106 is determined to be greater than a specified percentage. For example, the specified percentage can be five percent water content by weight. At 306, a flowline temperature downstream of the well-choke 106 is determined to decrease to be less than a first specified temperature. Steps 304 and 306 can occur simultaneously or in any sequence. At 308, a heating jacket 110 is activated in response to determining that the flowline temperature is less than the first specified temperature. In some instances, a pressure is determined within the flowline 104 in response to a signal from the pressure sensor 114. In some instances, the heating jacket 110 is activated in response to the determined pressure. At 310, a flowline 104 temperature downstream of the well-choke 106 is determined to increase to be greater than a second specified temperature that is equal to or greater than the first specified temperature. In some instances, deactivation can be performed in response to a change in water content, pressure, or both. At 312, the heating jacket 110 is deactivated in response to determining that the flowline 104 temperature is greater than the second specified temperature. In some instances, the heating jacket 110 is deactivated in response to the determined pressure.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be previously described as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, to achieve desirable results. Alternatively or additionally, not all illustrated operations may be required to be performed to achieve desirable results. Moreover, the separation of various system components in the implementations previously described should not be understood as requiring such separation in all implementations, and it should be understood that the described program components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method for controlling a system of prevent hydrate formation in a flowline, the system including a well-choke, a water content sensor positioned within a flowline downstream of the well-choke, a temperature sensor positioned downstream of the well-choke, a heating jacket surrounding at least a portion of the flowline, and a controller, the method comprising:
receiving a signal form each of the water content sensor and the temperature sensor;
controlling the heating jacket responsive to a signal form each of the water content sensor and the temperature sensor;
determining that a water content of a production fluid flowing through an open well-choke is greater than a specified percentage response to the signal received form the water content sensor;
determining that a flowline temperature downstream of the well-choke decreases to be less than a first specified temperature based on the signal received from the temperature sensor;
activating the heating jacket in response to determining that the flowline temperature is less than the first specified temperature;
determining that a flowline temperature downstream of the well-choke increases to be greater than a second specified temperature that is equal to or greater than the first specified temperature based on the signal received form the temperature sensor; and deactivating the heating jacket in response to determining that the flowline temperature is greater than the second specified temperature.

2. The method of claim 1, further comprising opening the well-choke configured to throttle production of a well.

3. The method of claim 1, further comprising:
determining a pressure within the flowline in response to a signal from a pressure sensor; and
activating the heating jacket in response to the determined pressure.

4. The method of claim 1, further comprising:
determining a pressure within the flowline in response to a signal from a pressure sensor; and
deactivating the heating jacket in response to the determined pressure.

5. The method of claim 1, wherein the specified percentage is five percent.

6. The method of claim 1, wherein the temperature sensor comprises a distributed temperature sensor.

7. The method of claim 1, wherein activating the heating jacket comprises directing an electrical current through heat elements within the heating jacket.

8. The method of claim 7, wherein the current is a direct current.

9. The method of claim 7, wherein the heating elements comprise inductive heating elements.

\* \* \* \* \*

UNITED STATES PATENT AND TRADEMARK OFFICE
CERTIFICATE OF CORRECTION

PATENT NO.         : 10,822,564 B2
APPLICATION NO.    : 16/832200
DATED              : November 3, 2020
INVENTOR(S)        : Jana Mohammed Aljindan Page 1 of 1

It is certified that error appears in the above-identified patent and that said Letters Patent is hereby corrected as shown below:

On the Title Page

Column 2 (OTHER PUBLICATIONS), Line 2, delete "Deemulsification" and insert
-- Demulsification --.

Signed and Sealed this
Twelfth Day of January, 2021

Andrei Iancu
*Director of the United States Patent and Trademark Office*